US009424388B2

(12) United States Patent
Greco et al.

(10) Patent No.: US 9,424,388 B2
(45) Date of Patent: Aug. 23, 2016

(54) DIVIDING LITHOGRAPHY EXPOSURE FIELDS TO IMPROVE SEMICONDUCTOR FABRICATION

(71) Applicant: International Business Machines Corporation, Armonk, NY (US)

(72) Inventors: Stephen E. Greco, Lagrangeville, NY (US); Rasit O. Topaloglu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 14/573,535

(22) Filed: Dec. 17, 2014

(65) Prior Publication Data

US 2016/0180003 A1    Jun. 23, 2016

(51) Int. Cl.
*G06F 17/50*    (2006.01)

(52) U.S. Cl.
CPC .................. *G06F 17/5081* (2013.01)

(58) Field of Classification Search
CPC .......................... G06F 17/5068; G06F 2217/12
USPC ......................................... 716/50, 51, 54, 55
See application file for complete search history.

(56) References Cited

U.S. PATENT DOCUMENTS

| | | | | |
|---|---|---|---|---|
| 6,473,881 | B1 * | 10/2002 | Lehner ................ | G06F 17/5068 703/14 |
| 6,700,647 | B2 | 3/2004 | Kim | |
| 6,888,616 | B2 | 5/2005 | Cooper et al. | |
| 7,030,965 | B2 * | 4/2006 | Takahashi .......... | G02B 17/0844 355/67 |
| 7,317,510 | B2 | 1/2008 | Bontekoe et al. | |
| 7,319,944 | B2 * | 1/2008 | Nakamura .............. | G03F 1/144 438/16 |
| 7,649,615 | B2 | 1/2010 | Case et al. | |
| 8,438,505 | B2 * | 5/2013 | Tsai ..................... | G06F 17/5081 716/106 |
| 8,453,089 | B2 * | 5/2013 | Teoh ................... | G06F 17/5031 716/111 |
| 8,741,511 | B1 * | 6/2014 | Zhou ........................ | G03F 1/36 430/30 |
| 8,856,698 | B1 * | 10/2014 | Latypov .............. | G06F 17/5068 716/53 |
| 2005/0151952 | A1 | 7/2005 | Wang et al. | |
| 2006/0160037 | A1 | 7/2006 | Brodsky et al. | |

FOREIGN PATENT DOCUMENTS

JP           06310395 A       11/1994

OTHER PUBLICATIONS

Shirai et al., "64M-bit DRAM Production with i-line Stepper", pp. 256-274, SPIE vol. 1463, Optical/Laser Microlithography IV, 1991, <http://dx.doi.org/10.1117/12.44786>.

* cited by examiner

*Primary Examiner* — Sun Lin
(74) *Attorney, Agent, or Firm* — Steven J. Meyers; Hoffman Warnick LLC

(57) ABSTRACT

In an approach to determine one or more exposure areas in a reticle field and associated lithography process parameters for the one or more exposure areas, a computer receives a semiconductor design and sends the semiconductor design to a design analysis program. Additionally, the computer receives data from the design analysis program. Furthermore, the computer determines the one or more exposure areas in the reticle field, and at least one lithography process parameter for each exposure area of the one or more exposure areas in the reticle field based, at least in part, on the data received from the design analysis program, the semiconductor design, and one or more clustering algorithms associated with the design analysis program.

20 Claims, 11 Drawing Sheets

PATTERN A

OPTIMAL PROCESS

DOSE = 1.2
FOCUS = 10

PATTERN B

DOSE = 1.0
FOCUS = 2

PATTERN C

DOSE = 1.1
FOCUS = 5

DIVIDING LITHOGRAPHY EXPOSURE FIELDS TO IMPROVE SEMICONDUCTOR FABRICATION

BACKGROUND

The present invention relates generally to the field of semiconductor wafer lithography, and more particularly to optimizing shutter arrangement in lithography steppers.

Lithography systems for lithography processing generally involve tools and processes to expose a desired pattern onto a resist layer on a semiconductor wafer, to develop the resist layer, and to remove the portions of the resist exposed (or, not exposed depending on the resist type). Then, following the lithography processes, further processing of the semiconductor wafer occurs, for example, by etching the underlying layer, implanting elements or depositing additional material using the developed resist layer. The processes to expose a pattern on a resist layer are commonly performed using a step and scan exposure tool such as a lithography stepper. A lithography stepper generally exposes a reticle field by scanning a slit of fixed width from one end of the reticle field to the other or, in some cases, by keeping the slit fixed and moving the wafer. A reticle is another name used for a lithography mask created from semiconductor design data such as semiconductor chip design data or semiconductor wafer data. Lithography imaging is highly dependent on wafer surface uniformity and circuit design elements to be processed, such as component patterns, line density, circuit devices or elements (i.e. microprocessor, cache, or deep trench capacitors).

Integrated circuits used in semiconductor chips are usually composed of distinct circuit components. Semiconductor chip components such as microprocessor cores, cache, and accelerators may be repeated on a semiconductor chip numerous times. The components such as microprocessor cores, accelerators, and cache typically have different design styles resulting in different types of patterns or metal patterns for designing components. Each type of component may have different parameters such as average metal density in the back end of the line (BEOL). Significant differences in average metal density can occur when one component has a much higher metal density than another nearby component, and can lead to differences in optimal processing conditions such as focus, dose, or ultraviolet light source used in lithography systems for the various components.

SUMMARY

According to one aspect of the present invention a method is disclosed for determining one or more exposure areas in a reticle field and associated lithography process parameters for the one or more exposure areas in the reticle field. The computer receives a semiconductor design and sends the semiconductor design to a design analysis program. The computer receives data from the design analysis program. Furthermore, the computer determines one or more exposure areas in the reticle field, and at least one lithography process parameter for each of the one or more exposure areas in the reticle field based, at least in part, on the data from the design analysis program, the semiconductor design, and one or more clustering algorithms associated with the design analysis program.

According to another aspect of the present invention a computer program product is disclosed for determining one or more exposure areas in a reticle field and associated lithography process parameters for the one or more exposure areas in the reticle field. The computer program product receives a semiconductor design and sends the semiconductor design to a design analysis program. The computer program product receives data from the design analysis program. Furthermore, the computer program product determines one or more exposure areas in the reticle field, and at least one lithography process parameter for each of the one or more exposure areas in the reticle field based, at least in part, on the data from the design analysis program, the semiconductor design, and one or more clustering algorithms associated with the design analysis program.

According to yet another aspect of the present invention a computer system is disclosed for determining one or more exposure areas in a reticle field and associated lithography process parameters for the one or more exposure areas in the reticle field. The computer system receives a semiconductor design and sends the semiconductor design to a design analysis program. The computer system receives data from the design analysis program. Furthermore, the computer system determines one or more exposure areas in the reticle field, and at least one lithography process parameter for each of the one or more exposure areas in the reticle field based, at least in part, on the data from the design analysis program, the semiconductor design, and one or more clustering algorithms associated with the design analysis program.

DETAILED DESCRIPTION

Figure 1:
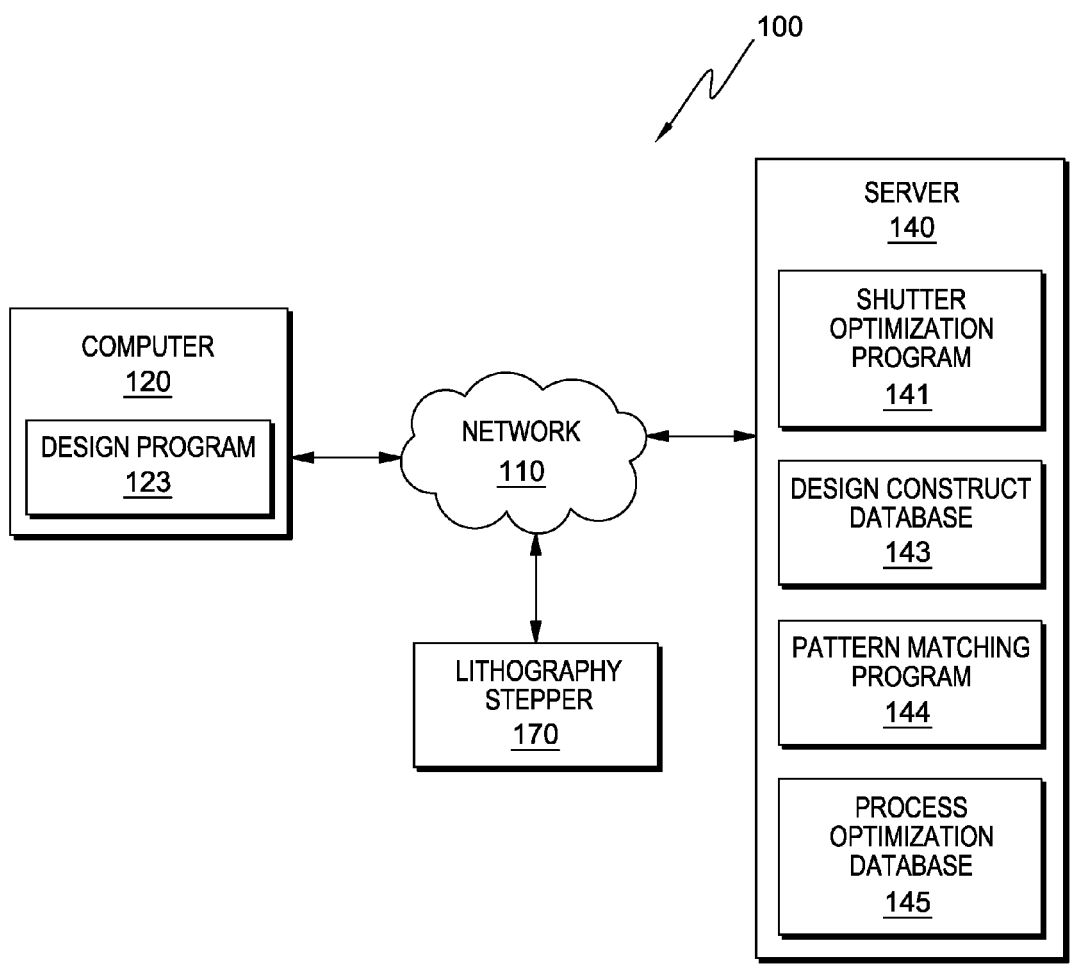
FIG. 1 is a functional block diagram illustrating a distributed data processing environment for a shutter optimization program for semiconductor processing, in accordance with an embodiment of the present invention.

Embodiments for the present invention recognize that a semiconductor wafer design for manufacture may have many semiconductor chip designs with chip designs, design elements, or semiconductor device components from one or more customers. When different design elements and semiconductor device components designed with varying design approaches are merged together on a wafer, significant process challenges may arise for lithography tools and processes.

Embodiments of the present invention provide an approach to use lithography stepper shutters for the creation of smaller exposure areas, or minifields, within a reticle field. A minifield is a portion of a reticle field, while a reticle refers to a lithography mask used for semiconductor fabrication. The smaller exposure areas (e.g. minifields) provide an opportunity for better resolution at lithography, the use of lithography processes that are optimized for the smaller exposure area, and the minimization of overlay errors. The lithography processes may be optimized for the smaller exposure areas based on the specific semiconductor components or design patterns within the minifield. The use of a smaller exposure area or a minifield within a reticle field may increase yields at lithography while avoiding the creation of additional, costly reticles or lithography masks to achieve the increase in yields. Embodiments of the present invention determine an optimal shutter location or placement to create minifields within a reticle field, and determine optimal lithography processes for a minifield.

In an exemplary embodiment, pattern matching algorithms in a pattern matching program are utilized with clustering algorithms to group similar patterns which are used to determine optimal shutter locations creating minifields, and optimal lithography processes for the patterns in the minifield. In other embodiments of the present invention, data from other design analysis programs or models including overlay error data, thin film stress data, or shorts and opens data along with empirical data (i.e. historical yield or optimum process data) may be used in conjunction with clustering algorithms associated with data from the other design analysis program to determine minifields, shutter locations to form minifields, and optimal lithography processes for the minifields. For example, shutter optimization program 141 would use clustering algorithms configured or tailored to overlay error data to determine one or more exposure areas in a reticle field.

For each determined smaller exposure area or minifield, optimal lithography processes are determined for lithography process parameters. Lithography process parameters may include one or more of dose, focus, source, field magnification but, are not limited to these parameters. Optimal lithography processes include optimal lithography process parameters for an element of a semiconductor chip design which may be a design element such as a pattern in a design, a microprocessor core, or a cache, or a specific type of chip design. In an exemplary embodiment, optimal processes for patterns used in the semiconductor design are stored in a database and retrieved as determined by the shutter optimization program for use in the lithography processes of a determined minifield.

Additionally, embodiments of the present invention provide a method to merge semiconductor design data for lithography masks split into minifields, and create an overlap or "stitch" area in the design between minifields for a cohesive and complete exposure of the circuit elements crossing minifield borders or minifield boundaries.

The present invention will now be described in detail with reference to the Figures. FIG. 1 is a functional block diagram illustrating a distributed data processing environment, generally designated 100, in accordance with one embodiment of the present invention. Distributed data processing environment 100 includes computer 120, server 140 and lithography stepper 170 interconnected over network 110. FIG. 1 provides only an illustration of one implementation of the present invention and does not imply any limitations with regard to the environment in which different embodiments may be implemented. Modifications to the depicted environment may be made by those skilled in the art without departing from the scope of the invention as recited by the claims.

In an exemplary embodiment, network 110 is the Internet representing a worldwide collection of networks and gateways that use Transmission Control Protocol/Internet Protocol (TCP/IP) protocols to communicate with one another. Network 110 may include a cable, a router, switches and/or a firewall. Server 140, computer 120 and lithography stepper 170 are interconnected by network 110. Network 110 can be any combination of connections and protocols capable of supporting communications between server 140, computer 120 and lithography stepper 170. Network 110 may also be implemented as a number of different types of networks, such as an intranet, a local area network (LAN), a virtual local area network (VLAN), a wide area network (WAN), or any combination of a number of different types of networks. FIG. 1 is intended as an example, and not as an architectural limitation for the different embodiments.

In the exemplary embodiment, computer 120 is a client to server 140. Computer 120 includes design program 123. Computer 120 is capable of creating a semiconductor design using design program 123. A semiconductor design may be a semiconductor chip design, a semiconductor wafer design using multiple semiconductor chips, a functional element of a semiconductor wafer or a semiconductor chip, or another semiconductor device design (for example, optical devices or other device types). In the exemplary embodiment, a semiconductor design is a semiconductor chip design. Computer 120 accesses design construct database 143 over network 110 to use pre-designed semiconductor components or patterns in addition to designer created circuit elements not in design construct database 143 for the semiconductor design. A pattern is a common, repeated design element used in semiconductor chip design. Patterns may be stored in a design construct database, such as design construct database 143 discussed later. An example of some simplified patterns may be as illustrated later in FIG. 3. Computer 120 sends design data generated by design program 123 to shutter optimization program 141 on server 140 via network 110. In one embodiment, shutter optimization program 141 resides on computer 120. In another embodiment, design construct database 143 may reside on computer 120.

In the exemplary embodiment, computer 120 is a desktop computer. In other embodiments, computer 120 may be a notebook, a laptop, a personal digital assistant, a tablet, a smart phone, or other computing system connected to server 140 via network 110 and capable of creating, receiving, and sending semiconductor design data. In one embodiment, computer 120 may not be a client device to server 140 but, may be directly connected via network 110 with one or more computing devices such as laptop computers, desktop computers, notebooks, or smart phones which may utilize shutter optimization program 141, design construct database 143, pattern matching program 144, and/or process optimization database 145. In an embodiment, other semiconductor design analysis programs such as overlay error modelling programs may reside on computer 120.

Server 140 may be a web server, a server computer such as a management server, or any other electronic device or computing system capable of sending and receiving data. In another embodiment, server 140 represents a "cloud" of computers interconnected by one or more networks, where server 140 is a computing system utilizing clustered computers and components to act as a single pool of seamless resources when accessed through network 110. Server 140 includes shutter optimization program 141, design construct database 143, pattern matching program 144 and process optimization database 145. In an embodiment, server 140 includes design program 123. Shutter optimization program 141 located on server 140 receives, from design program 123 on computer 120, design data for semiconductor chips and semiconductor wafers used in shutter optimization program 141. Server 140 is capable of sending and receiving data to computer 120 and lithography stepper 170. Server 140 may include other semiconductor design analysis programs or models. For example, server 140 may include an overlay error analysis programs or shorts and opens modelling program.

Shutter optimization program 141 resides on server 140 and determines the optimal placement of shutters within a reticle field forming minifields and the optimal processes for the minifields. A shutter is used to cover a portion of a reticle. As is known to one skilled in the art, the use of smaller exposure fields may improve semiconductor chip yields for lithography processes. The shutter may be a thin plate or element opaque to light. The shutters present in lithography systems, such as steppers or scanners, may effectively block the "light" or a wavelength of the light projected to expose a layer of resist (the shutters effectively create a mask within the reticle field blocking an area of the wafer from resist expose). The shutters may be moved in a reticle field to create any number of minifields within the reticle field. The optimal shutter location or placement to create minifields for semiconductor design may be determined by shutter optimization program 141 using one or more of the several methods discussed below.

Figure 3:
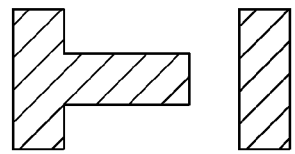
FIG. 3 is a diagram illustrating an example of patterns and optimal process data, in accordance with an embodiment of the present invention.
Figure 3:
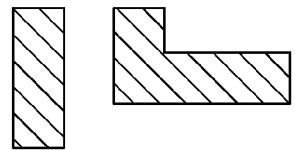
Figure 3:
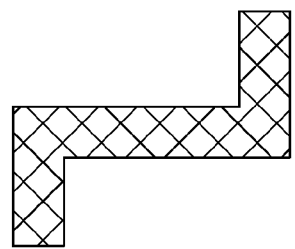

Shutter optimization program 141 receives semiconductor design data from computer 120 and data from a semiconductor design analysis program including data from modelling, or simulation programs that analyze a layer of a semiconductor design and/or empirical data such as historical yield data. Shutter optimization program 141 applies clustering algorithms to the received data to determine the optimal shutter arrangement for creating separate or smaller regions or smaller exposure fields (e.g. "minifields") within a reticle field. Shutter optimization program 141 determines the optimal lithography processes for the minifield, splits the semiconductor design data for minifields and creates an overlap or stitch pattern for the design or circuit elements crossing the borders between minifields. In the exemplary embodiment, shutter optimization program 141 receives pattern matching data from pattern matching program 144 and uses clustering algorithms to determine the optimal location for shutters creating minifields or smaller exposure areas in a reticle. A pattern or design construct may contain multiple design layers or in other words, may contain design data used to create portions of the pattern on more than one layer. Patterns may be stored in a design library or design construct database, such as design construct database 143 discussed later. An example of some simplified patterns may be as illustrated in FIG. 3.

In another embodiment, shutter optimization program 141 receives a user selection of overlay error modelling data analysis which is used in conjunction with clustering algorithms customized for overlay error data analysis. Overlay is defined as the positional accuracy with which a new lithographic pattern is printed on top of an existing pattern in a wafer. Overlay errors occur when different semiconductor layers are not aligned properly to the layers above or below. Overlay is defined as the positional accuracy with which a new lithographic pattern is printed on top of an existing pattern in a wafer. Overlay errors occur when different semiconductor layers are not aligned properly to the layers above or below. In shutter optimization program 141 a user may select from a pull-down screen or an icon labelled "overlay error analysis", for example. When a selection of overlay error analysis is received, shutter optimization program 141 loads the clustering algorithms associated with creating minifields based on overlay error modelling data. In one embodiment, the user may send overlay error modelling data for a semiconductor design to shutter optimization program 141. In another embodiment, shutter optimization program 141 may retrieve overlay error modelling data from a database on server 140 or another computer storing overlay error modelling data. Shutter optimization program 141 executes the clustering algorithms customized for overlay error modelling data to determine minifields based on the overlay error modelling data. For example, overlay error clustering algorithms may have a pre-set overlay error number that initiates the creation of four equal sized minifields to reduce overlay error. In addition, clustering algorithms for overlay error may include the addition of an overlay alignment mark or a microalignment mark in each created minifield. The overlay alignment mark in each minifield may be used to help monitor overlay errors between the different layers of a semiconductor device or wafer and to help identify the need to improve the alignment between the layers of a semiconductor design for lithography. As is known in the art, overlay errors are generally greater toward the edge of the exposure field. The creation of minifields with one or more smaller exposure fields may result in improved layer to layer alignment of circuit features and minimize overlay error.

In yet another embodiment, shutter optimization program 141 uses shorts and opens models in conjunction with clustering algorithms executed to determine optimal shutter locations and the resulting minifields for use in lithography processes to improve wafer yields. In an embodiment, designs which are modelled to have circuit features not resulting in a short or open failures, but are modelled to have expected variations (i.e. line widths or spacing) outside of a determined range specified in shutter optimization program 141 can be identified for the creation of minifields to improve circuit feature variations in lithography. In one embodiment, shutter optimization program 141 uses data such as metal wiring density which is determined by a model analyzing a layer of a semiconductor chip design to determine the areas of high metal wiring density or high metal density. The areas of high wiring density may be used by shutter optimization program 141 to determine minifield creation. Shutter optimization program 141 may use clustering algorithms grouped together in areas with similar wiring density in a layer of the semiconductor chip design or reticle field to form minifields and determine optimal shutter location.

In other embodiments of the present invention, shutter optimization program 141 receives data from other semiconductor design analysis, modeling, simulation programs, or empirical data including thin film stress simulations, design analysis for areas of parallel lines, component analysis (i.e.

microprocessors, cache, etc.), or other type of modelled or measured data (not illustrated in FIG. 1). For example, the other design analysis programs which may include, but are not limited to: thin film stress models, models of empirical data such as historical yield data, or other similar simulation or modelling programs may reside on server 140. A thin film stress simulation program analyzing thin film stresses to determine the stresses induced in the thin films of a layer of a semiconductor chip due to the various thermal co-efficients of expansion of different materials present in the other layers of a semiconductor chip may create stress data to be sent to shutter optimization program 141. Shutter optimization program 141 may utilize thin film stress analysis with clustering algorithms to determine a number of minifields based on a threshold stress level. For example, when a thin film stress of a pre-set percent or a pre-set stress level is identified from modelling data in a layer of a semiconductor design within a reticle, then shutter optimization program 141 may create two minifields based on the thin film stress analysis.

In an embodiment, the other design analysis programs which may include, but are not limited to: overlay modelling programs, thin film stress models, models of empirical data such as historical yield data, shorts and opens modelling programs or other similar simulation or modelling programs may reside on computer 120, or on another server, a cloud, or another computer not depicted in FIG. 1. Shutter optimization program 141 receives the data from other semiconductor design analysis programs such as an overlay error program or a shorts and opens program and uses clustering algorithms to determine optimal shutter locations for the minifields and determines optimal lithography processes for the minifields. The clustering algorithms are customized to utilize the data provided by the specific semiconductor design analysis modelling program by a user who may be a process engineer. For example, the clustering algorithms for a shorts program may be customized by a user to group together patterns on a design layer predicted to have a high degree of shorts to determine the minifields and an optimal lithography process. In this example, for minifields created from areas predicted to have a significant number of shorts, shutter optimization program 141 may be configured to increase the dose, for example by 2%, for the optimum lithography process when using a positive resist at exposure. Conversely, shutter optimization program 141 may slightly decrease dose for an optimal dose in a minifield with areas with a significant number of shorts when using a negative resist.

In one embodiment, shutter optimization program 141 may be run on selected layers for a semiconductor design as determined by a user who may be a process engineer or product engineer. For example, a pull down menu in shutter optimization program 141 may receive input from a user to analyze only the first two layers of a semiconductor design for minifield creation. In another embodiment, shutter optimization program 141 may be run on all layers of the semiconductor design. Shutter optimization program 141 utilizes clustering algorithms to determine optimal shutter locations that create rectilinear regions or rectilinear minifields (i.e. rectangular minifields). In the exemplary embodiment, shutter optimization program 141 accesses process optimization database 145 to retrieve the optimal process data for the minifields. The optimal process data for the minifield may be determined by the dominant pattern or most commonly occurring pattern in the minifield.

Design construct database 143 on server 140 contains a library of design shapes and patterns used in semiconductor chip design. The design shapes or patterns which will be referred to as "patterns" may include commonly used patterns or design constructs. In an embodiment, empirical or historical yield data is used to identify patterns known to be easily produced or manufactured (i.e. high yield patterns), and patterns difficult to manufacture (i.e. low yield patterns). Design construct database 143 may be accessed by design program 123 on computer 120 via network 110 to generate a semiconductor design. In an embodiment, design construct database 143 may be accessed by shutter optimization program 141 for pattern matching algorithms to identify patterns used in determining minifields. In the exemplary embodiment, the patterns in design construct database 143 are pre-loaded or included in pattern matching program 144. While depicted on server 140 in FIG. 1, design construct database 143 may reside on computer 120 or, another computing device not shown, and accessed by shutter optimization program 141 via network 110.

Pattern matching program 144 on server 140 matches or correlates patterns used in a semiconductor design to known patterns such as those stored in design construct database 143. Pattern matching program 144 utilizes standard pattern matching algorithms to identify in a semiconductor design, or portion of a semiconductor design such as a layer of a semiconductor chip design, commonly used semiconductor design patterns such as the design patterns stored in design construct database 143. Pattern matching program 144 may be run on a layer of a semiconductor design to identify or match the patterns used in the design and identify the location of each pattern identified. In an exemplary embodiment, the patterns from design construct database 143 are pre-loaded or pre-set in pattern matching program 144. In another embodiment, any number of patterns may be selected and loaded into pattern matching program 144 for use with pattern matching algorithms.

Process optimization database 145 on server 140 contains optimal process parameters associated with the patterns residing in design construct database 143. In the exemplary embodiment, shutter optimization program 141 accesses process optimization database 145 to obtain an optimal process for a pattern. An optimal process is stored in process optimization database 145 for each pattern in design construct database 143. The optimal processes, as determined by a process engineer, for example, are entered by a user into process optimization database 145 for each pattern. Optimal or optimized lithography process parameters including, but not limited to dose, focus, source, or field of magnification may be determined by historical yields, optimized by engineering process optimization, or engineering judgment by a responsible process engineer, manufacturing process lead, or manufacturing engineer for example. Optimal or optimized lithography process parameters may provide a high yield, the highest yields, an acceptable or allowable yield for a specific product (e.g. memory) or a manufacturing line as specified by a process or manufacturing line owner for an associated pattern, logic or design element such as a deep trench capacitor or microprocessor. Optimal lithography processes and process parameters may be entered into process optimization database 145 by a responsible engineer or by the database owner receiving the process parameters from the responsible process owner. In an embodiment, the optimal lithography processes may be a range of process parameters providing an acceptable process yield. For example, pattern X may have an optimal process range for focus which is 2 to 5 or, pattern Y may have an optimal process range of focus 1 to 2. In one embodiment, process optimization database 145 may be configured to determine a range for an optimal process stored for a pattern by using a multiplier such as 1.02 or 1.05 on an optimum process to determine an optimum process range for a parameter such as dose. Optimal lithography processes within process optimization database 145 may include an optimal dose, an optimal focus, an optimal focus and dose, or a range for optimal dose and focus in addition to other combinations and information such as optimal source or optimal field of magnification for a pattern.

In another embodiment, process optimization database 145 stores a pattern and associates the pattern with an optimal process and a historical yield. For example, in process optimization database 145, pattern A has historical yield data of 99.3% through lithography processes while pattern C produces a 95.6% yield. In an embodiment, a pattern is stored with an optimal process and an optimum process yield by the type of lithography tool or by the specific lithography stepper producing the historical yield. In one embodiment, a pattern with an associated optimal process in process optimization database 145 may be given a numerical rating based on yield data. For example, a scale of one to ten, a weight, or a real number based on historical yield data for a pattern on a manufacturing line may be stored in process optimization database 145. For example, a numerical one to ten rating may be stored in process optimization database 145 for the pattern. In another example, a pattern using the optimal process with a historical yield greater than 99.7% may be rated one. In an embodiment, empirical or historical yield data is used to rate patterns stored in process optimization database 145 based on historical yields. For example, patterns may be rated or grouped by similar ranges of yields. A historical yield for a pattern may be multiplied by 1.05 or 0.95, for example, to determine the yield range for a pattern. Patterns with similar yield ranges based on historical yield data may be grouped or rated on a numerical or other scale such as A, B, C, or D. In an embodiment, shutter optimization program 141 uses historical process yield data to determine minifields. For example, the clustering algorithms used by shutter optimization program 141 may be configured to create a minifield when patterns with low historical process yields are identified (i.e. for patterns with yields less than 96.8% insert a minifield).

While depicted on server 140 in the exemplary embodiment, process optimization database 145 may be on a remote server or a "cloud" of computers interconnected by one or more networks utilizing clustered computers and components to act as a single pool of seamless resources, accessible by shutter optimization program 141 via network 110. In another embodiment, process optimization database 145 may reside on computer 120.

Lithography stepper 170 is a lithography stepper system in the exemplary embodiment. On another embodiment, lithography stepper 170 may be any type of lithography system for semiconductor manufacture which may utilize a shutter or another type of adjustable element selectively blocking "light" or a wavelength of light or other radiation used in the exposure of a layer of a semiconductor device, chip or wafer. Lithography stepper 170 is connected to computer 120 and server 140 via network 110. In the exemplary embodiment, lithography stepper 170 may receive semiconductor design data which includes an identification of optimal shutter placement creating minifields within a reticle field from shutter optimization program 141 via network 110. In an embodiment, lithography stepper 170 receives optimal lithography process data for each minifield from shutter optimization program 141 on server 140. In another embodiment, lithography stepper 170 receives design data, shutter location, and optimal lithography process data from computer 120.

Figure 2:
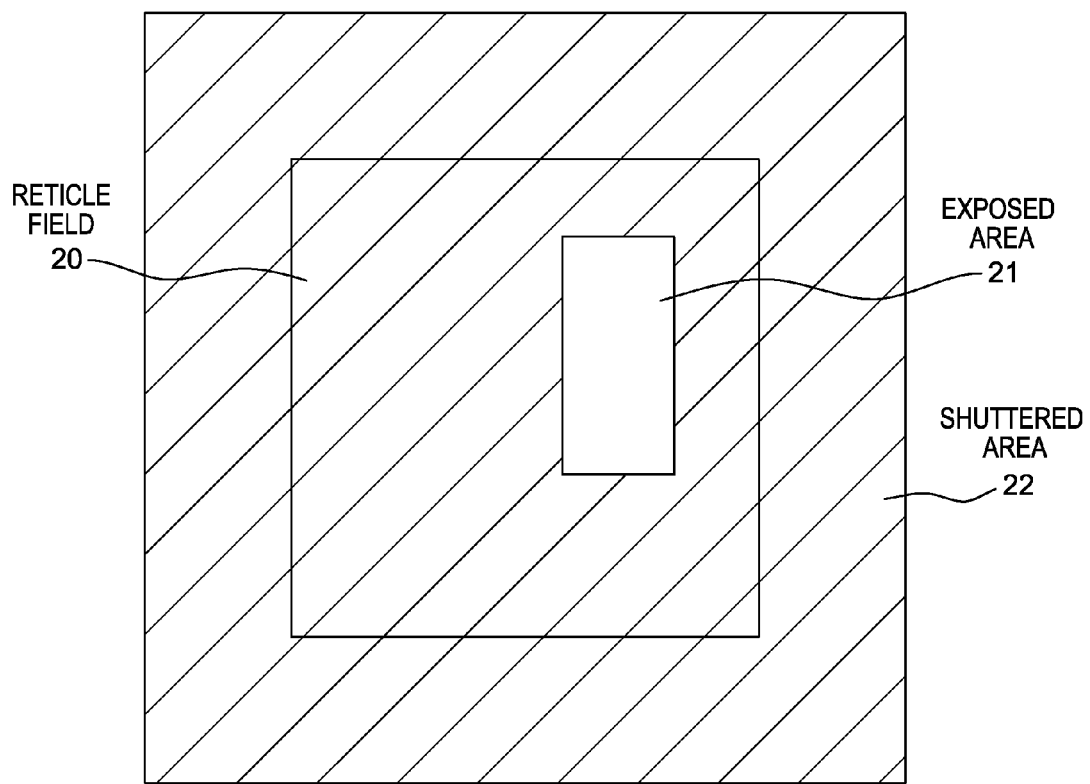
FIG. 2 is a diagram illustrating a minifield created by the shutter optimization program, in accordance with an embodiment of the present invention.

FIG. 2 is a diagram illustrating a minifield created by shutter optimization program 141, in accordance with an embodiment of the present invention. As depicted, FIG. 2 includes reticle field 20, exposed area 21, and shuttered area 22 (represented by the hatch shown in FIG. 2). Exposed area 21 is the minifield which may be a smaller exposed region or a portion of the reticle as determined by shutter optimization program 141. Four shutters are typically used in modern lithography tools such as lithography stepper tools. The four shutters are left, right, top and bottom shutters oriented orthogonally or at right angles to each other or parallel to each other. For example, top and left shutter edges are at right angles while left and right shutters are parallel to each other. The size and location of the minifield may be varied depending on the shutter locations. Minifields created with shutters in conventional lithography systems such as lithography stepper 170 are rectangular in shape, however, the minifields may not be limited to this shape.

FIG. 3 is a diagram illustrating an example of patterns and optimal lithography process data, in accordance with an embodiment of the present invention. As depicted, FIG. 3 includes Pattern A, Pattern B, and Pattern C with optimal dose and focus process parameters. Patterns A, B, and C are examples of patterns that may be stored in design construct database 143 for use in semiconductor design. The associated optimal lithography process parameters illustrated to the right of the design pattern are examples of optimal lithography process data which may be stored and associated with the design pattern in process optimization database 145. While FIG. 3 is an illustration of several possible patterns, a typical semiconductor design could use hundreds or in some cases thousands or more patterns. Additionally, design pattern construct database 143 may contain many design patterns which may number in the millions or more of different design patterns. In an embodiment, the optimal lithography processes are a range (i.e. process window) for each pattern. For example, Pattern B may have an optimal dose with a range of 3.0 to 6.0, with an optimal focus range of 9 to 10, or an optimal dose with a range of 1.2 to 3.0 with an optimal focus range of 3 to 5. The optimal process parameters depicted include dose and focus, however, process optimization database 145 is not limited to this information for a pattern and may include additional information such as preferred source, field of magnification, yield, or other data relevant to the processing of the pattern.

Figure 4A:
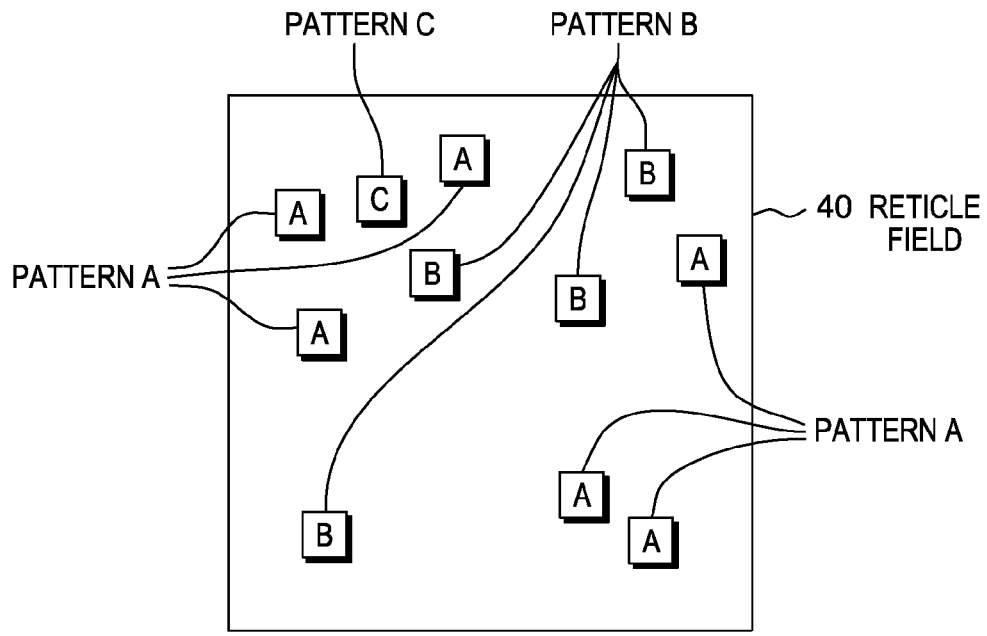
FIG. 4A is a diagram illustrating an example of a location of patterns within a reticle design, in accordance with an embodiment of the present invention.

FIG. 4A is a diagram illustrating an example of the location of patterns within a reticle design, in accordance with an embodiment of the present invention. As depicted, FIG. 4A includes reticle field 40, the locations of pattern A, pattern B, and pattern C within the design data used to create the reticle of reticle field 40. FIG. 4A illustrates the location of design patterns A, B, and C in reticle field 40 formed from a layer of a semiconductor chip design. In the exemplary embodiment, shutter optimization program 141 uses pattern matching program 144 to determine the location and the patterns used in reticle field.

Figure 4B:
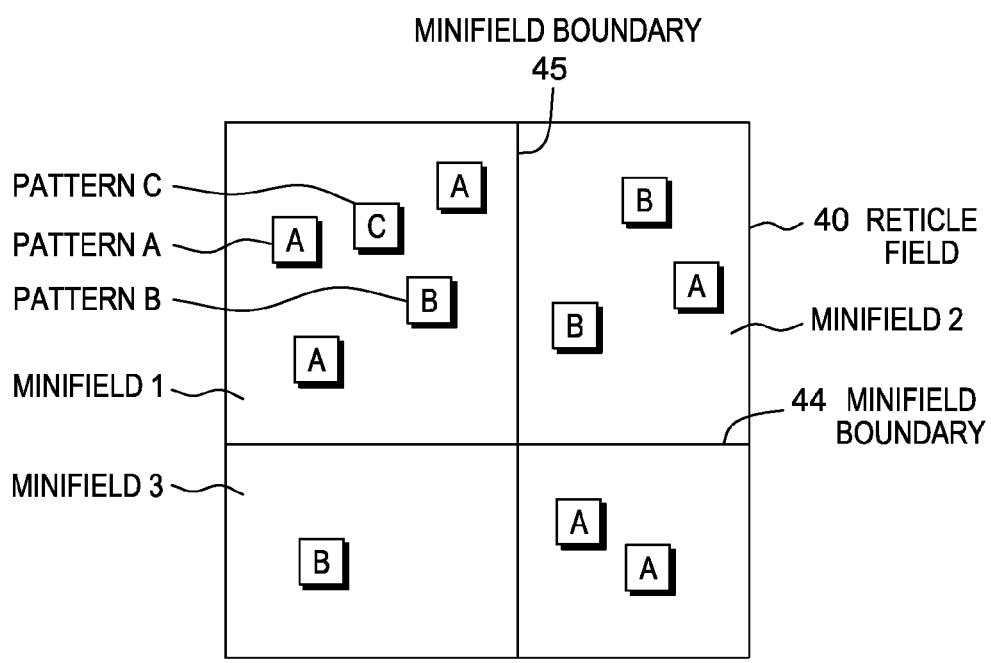
FIG. 4B is a diagram illustrating an example of a location of minifield boundaries within a reticle design, in accordance with an embodiment of the present invention.

FIG. 4B is a diagram illustrating an example of the location of minifield boundaries between minifields within a reticle design, in accordance with an embodiment of the present invention. As depicted, FIG. 4B includes the elements of FIG. 4A, minifield boundary 44 and minifield boundary 45 separating the reticle field into smaller minifields, illustrated as minifield 1, minifield 2, and minifield 3. Horizontal shutters such as indicated by minifield boundary 44 and vertical shutters such as indicated by minifield boundary 45, where a minifield boundary is a line indicating the boundary between minifields. In some cases, the minifield boundary may also be the edge of the shutter used in creating a minifield. The minifield boundary is depicted in FIG. 4B as a line. The shutters may be placed on either side of the minifield boundary to form a minifield.

The minifield boundaries such as minifield boundaries 44 and 45 can be placed anywhere in reticle field 40. With standard lithography tools, shutter placement and the location of the minifield boundary is limited to horizontal and vertical orientation, however, as lithography tools evolve, minifield boundary placement may not be limited to vertical and horizontal orientation. In the exemplary embodiment, the location of the minifield boundaries may be determined by shutter optimization program 141, however, the location of the minifield boundaries, the number of minifield boundaries, and the resulting number of minifields is not limited to the number of minifields or the locations depicted. In other embodiments, any number of minifield boundaries could be used to form any number of respective minifields.

Figure 5A:
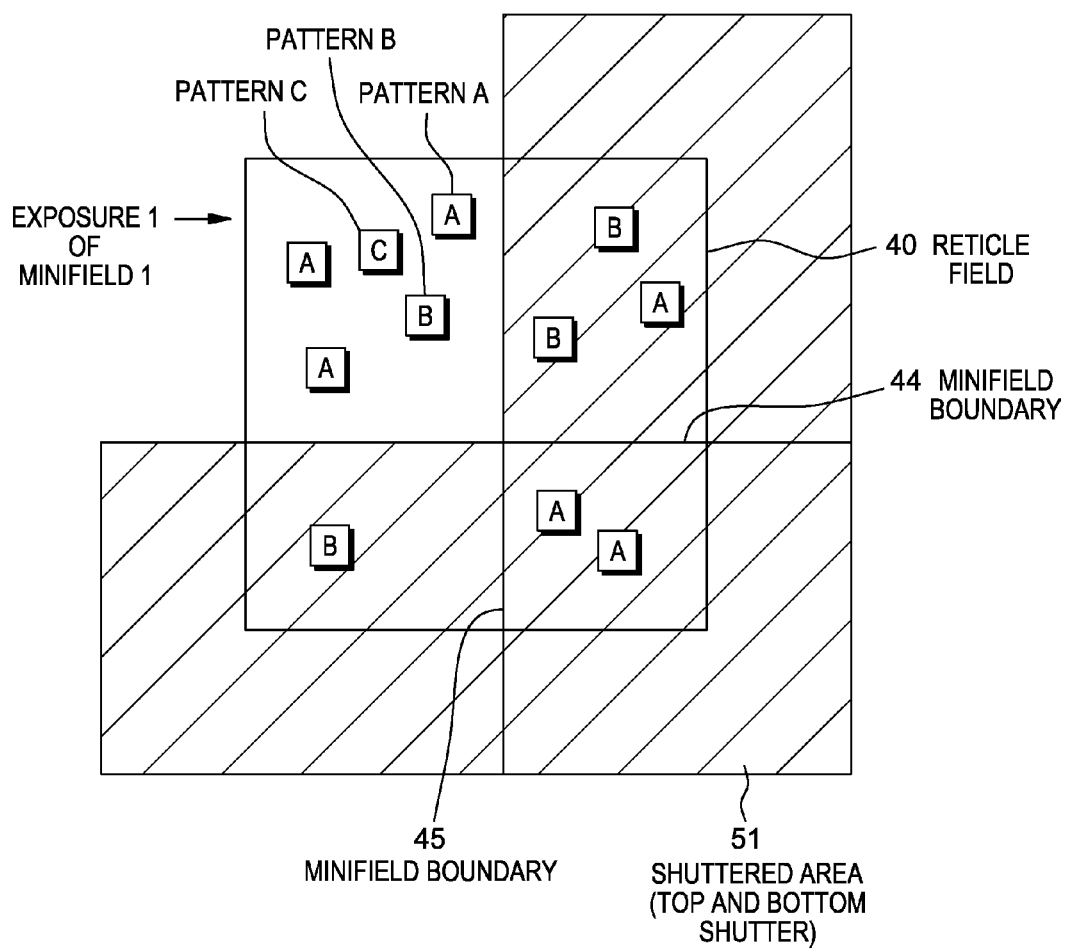
FIG. 5A is a diagram illustrating an example of a shutter location for an exposure of minifield 1 of FIG. 4B, in accordance with an embodiment of the present invention.

FIG. 5A is a diagram illustrating an example of shutter locations for an exposure of minifield 1, in accordance with an embodiment of the present invention. As depicted, FIG. 5A includes the elements of FIG. 4B and includes shuttered area 51 with the shutters used to expose minifield 1. Shutters may be used on either side of a minifield boundary such as minifield boundary 44 or minifield boundary 45 to exposure selected minifields and cover shuttered area 51. Minifield 1 in reticle field 40 may be exposed when the bottom shutter is aligned with minifield boundary 44 and when the right shutter is aligned with minifield boundary 45.

Figure 5B:
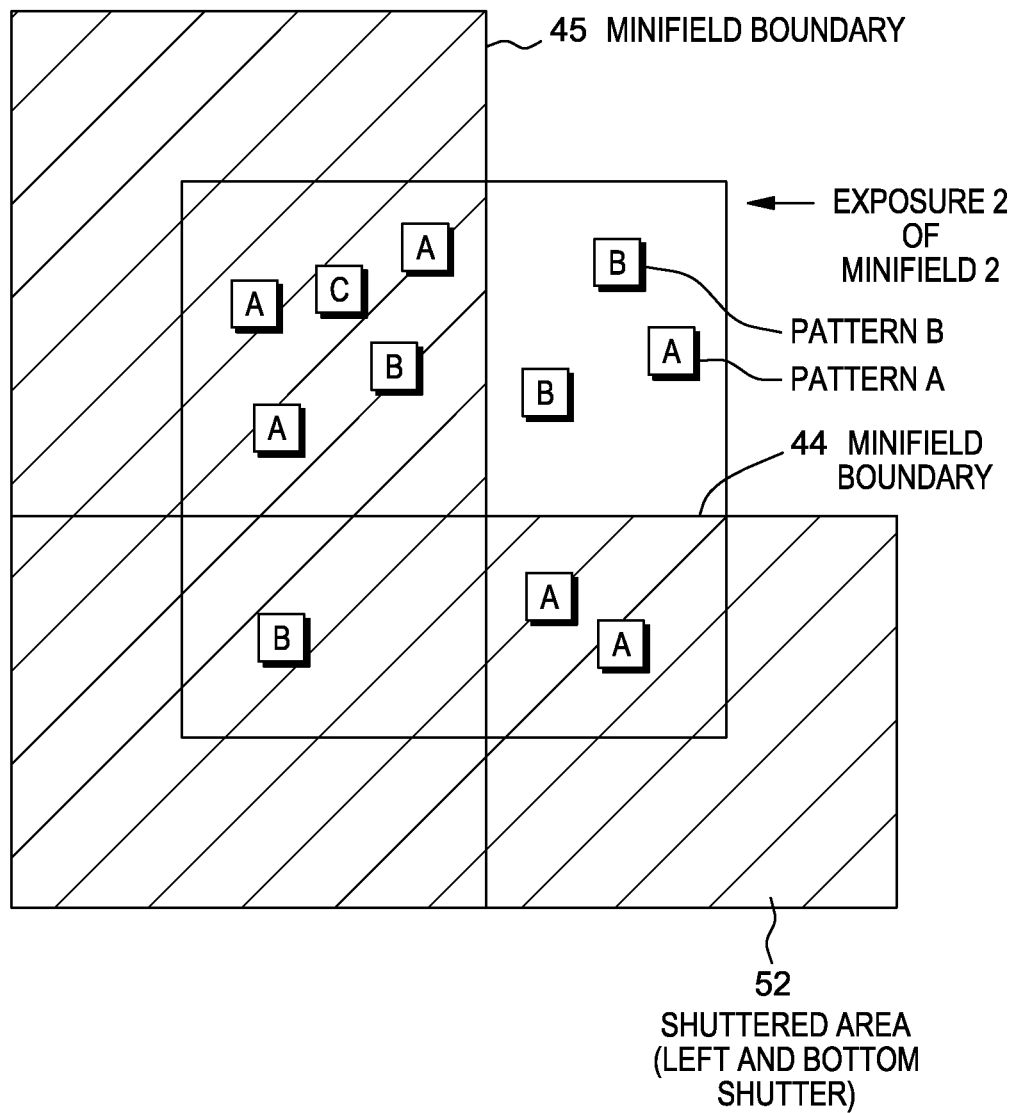
FIG. 5B is a diagram illustrating an example of a shutter location for an exposure of minifield 2 of FIG. 4B, in accordance with an embodiment of the present invention.

Similarly, FIG. 5B is a diagram illustrating an example of shutter locations for an exposure of minifield 2. As depicted, FIG. 5B includes the elements of FIG. 5A but, with a different shuttered area 52 which leaves minifield 2 exposed. The bottom shutter is still aligned below minifield boundary 44 while the left shutter is aligned with minifield boundary 45. Minifield 2 is not covered by a shutter and can be exposed with selected lithography setting and parameters. Similarly, although not shown, the top shutter may be positioned on minifield boundary 44 such that minifield 3 is exposed.

Figure 6A:
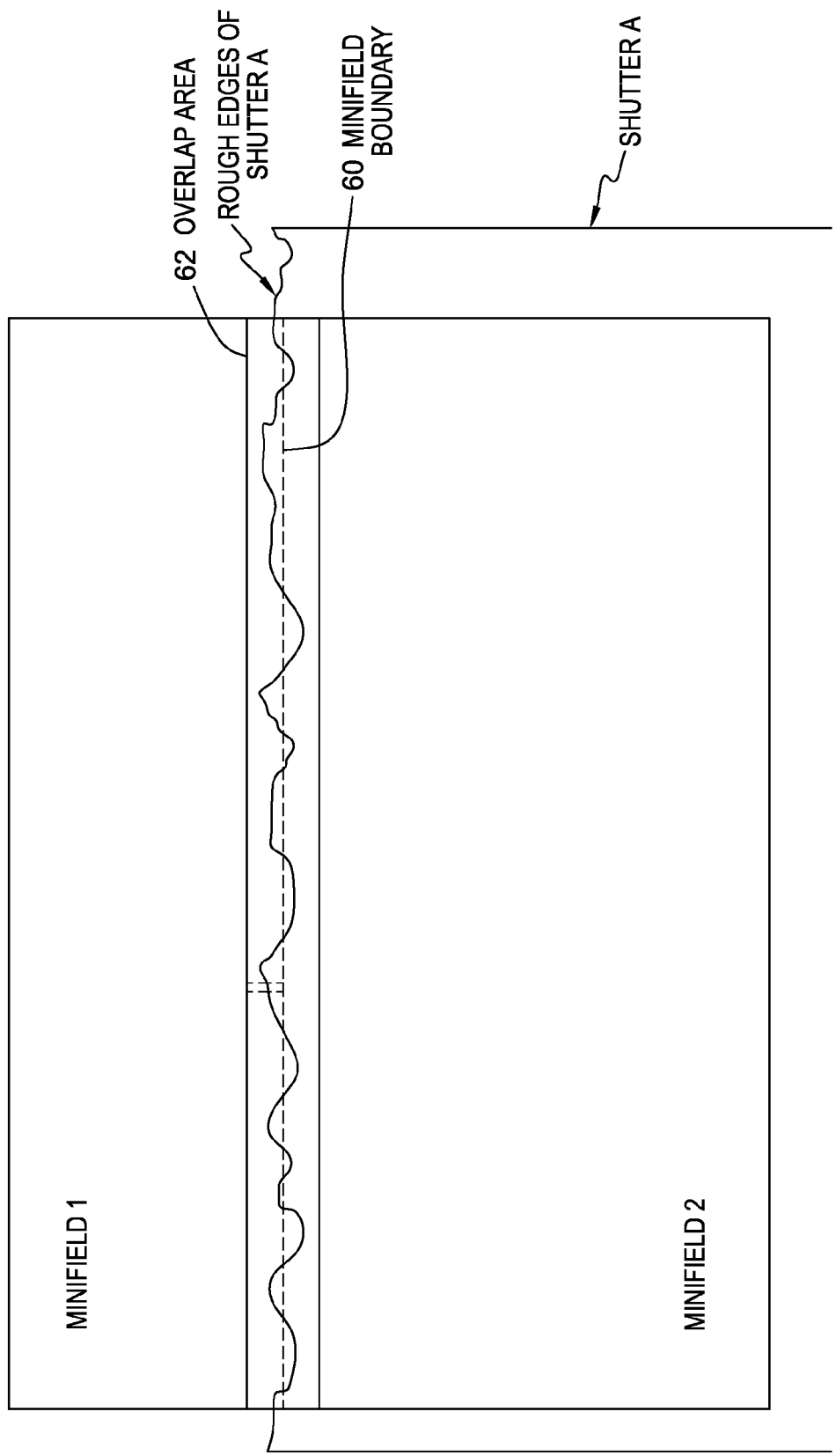
FIG. 6A is a diagram illustrating an example of shutter edge roughness, in accordance with an embodiment of the present invention.

FIG. 6A is a diagram illustrating an example of shutter edge in accordance with an embodiment of the present invention. As depicted, FIG. 6A includes minifield 1, minifield 2, minifield boundary 60, shutter A, overlap area 62 and an illustration (not to scale) of the rough edges of shutter A along minifield boundary 60. Minifield boundary 60 is the line representing the location of the shutters or the location of the shutter edges for creation of minifields 1 and 2. Illustrated on shutter A is the microscopic roughness (not shown to scale) that is known in the art to occur on shutters within lithography steppers such as lithography stepper 170.

While lithography tools such as lithography stepper 170 are capable of the precise alignment of minifields required for semiconductor device fabrication, the merging of the minifields must take into account the microscopic roughness of the shutter edges and any additional tooling tolerances of the lithography tool (i.e. alignment tolerances in the wafer holding plates, the reticle alignment, etc.) and provide a small safety factor to insure all desired electrical connections or desired open areas without contact are made between minifields. Shutter optimization program 141 determines the required "overlap" of the minifield exposure fields or exposure area to ensure that all images are printed and all required electrical connections made (i.e. no open lines or unconnected circuit features at minifield boundaries due to tooling tolerances or shutter edge roughness). Shutter optimization program 141 is pre-loaded with the various placement, alignment, and tooling tolerances associated with a lithography stepper such as lithography stepper 170. In an embodiment, the various placement, alignment, and tooling tolerances associated with a lithography stepper are stored in a database and retrieved from the database by shutter optimization program 141. The width of the overlap region or "overlap" includes the of roughness of the shutter edges, the tolerance of the associated lithography tooling (i.e. shutter, wafer, and reticle placement), and program determined additional tolerance or a "safety factor" to insure that if all tolerances had the least favorable values, a connection (or open area depending on the design) is made. In one embodiment, shutter optimization program 141 may determine the safety factor as a percentage of the shutter edge roughness and lithography tool tolerances. For example, the safety factor may be ten percent of the value of the combined shutter roughness and lithography tool tolerances. Overlap area 62 is an illustration of the location of the overlap area between minifields 1 and 2 as determined by shutter optimization program 141.

In one embodiment, the overlap may be determined by the lithography tool alignment tolerances which includes shutter edge tolerances and a number or percentage of the semiconductor design feature size based on an identification of the semiconductor design ground rules for the safety factor. The semiconductor ground rules may include one or more of the following: the feature geometry or process circuit feature size such as 20 nanometer or 14 nanometer, semiconductor substrate type (e.g., silicon-on-insulator, bulk, GaAs, etc.) and/or layers (e.g., M1, back end of line, etc.). For example, a user may select a semiconductor technology or semiconductor technology design ground rules from a pull down menu such as a fourteen nanometer technology on a silicon-on-insulator wafer for the M1 layer (i.e. first metal layer). The fourteen nanometer M1 layer on a silicon-on-insulator may have a defined overlap of 0.064 microns, for example.

In one embodiment of the present invention, shutter optimization program 141 determines the shutter location to be retracted one half of the determined overlap width short of minifield boundary 60 for each minifield. In this case, overlap area 62 receives a double exposure. While this method insures that no open circuits will occur due to lithography tooling tolerances, an area of double exposure may be created between minifield 1 and minifield 2 on minifield boundary 60. The design features such as lines and other circuit elements in the overlap region may receive a double exposure. A double exposure of fine lines with a positive resist may cause wider lines which may result in yield issues such as "blow out" where the double exposure causes lines to get wider and short together and may be especially common with fine lines and close spaces between lines. A design practice used in the art between reticles and shutter areas is the use of relaxed ground rules in the overlap areas where relaxed ground rules are design ground rules that use larger lines and spaces in the overlap area and the area immediately adjacent the overlap area that would be tolerant of adjacent feature dose variations (i.e. overlap features receiving double the dose of connecting or nearby lines or circuit elements). In this embodiment, shutter optimization program 141 may need to apply relaxed ground rules to the minifield overlap areas. In some cases, the design may require some re-design in the overlap area. In other cases, a user may select to re-run shutter optimization program 141 with different clustering algorithms changing minifield locations and shutter locations to accommodate overlap. However, other solutions to the overlap area may provide more efficient solutions to merging the overlap of minifields.

Figure 6B:
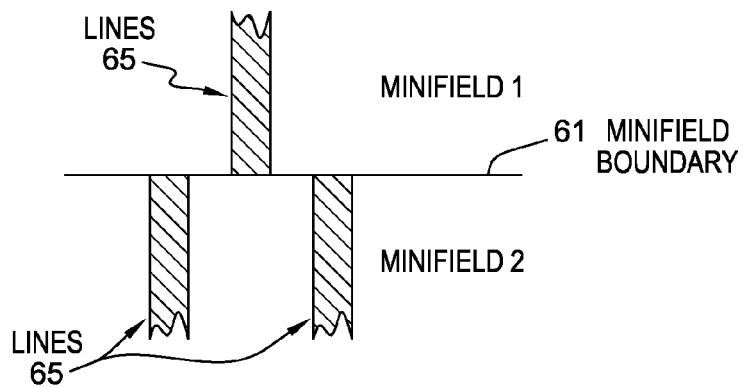
FIG. 6B is a diagram illustrating an example of color flipping at a minifield boundary in a split reticle and a design addition for a reticle design in a dual mask system, in accordance with an embodiment of the present invention.
Figure 6B:
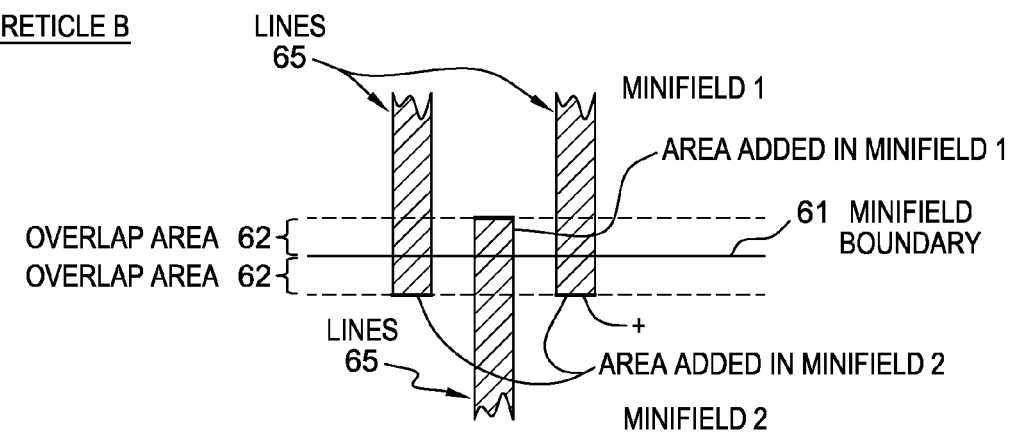
Figure 6B:
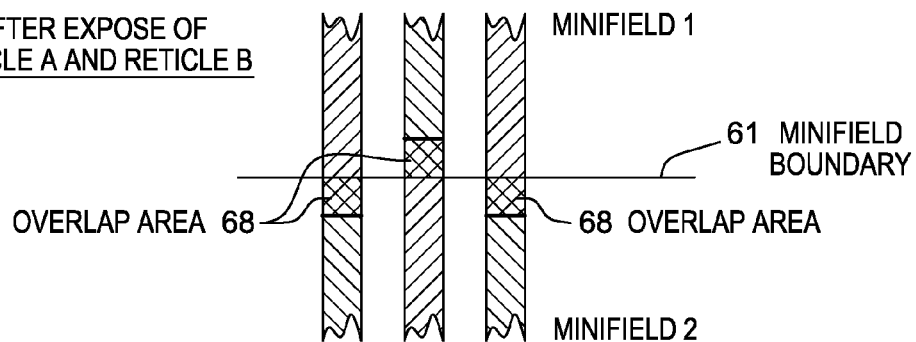

FIG. 6B is a diagram illustrating an example of color flipping at a minifield boundary in a split reticle and a design addition to lines in accordance with an embodiment of the present invention. As depicted, FIG. 6B includes reticle A, with minifield 1, minifield 2, minifield boundary 61 and lines 65, and reticle B with minifield 1, minifield 2, minifield boundary 61, overlap area 62, lines 65, and area added to lines 65. FIG. 6B also depicts reticle A and reticle B after expose, and overlap area 68. Two overlap areas 62 are depicted in reticle B (one on each side of minifield boundary 61). In this embodiment, color flipping and an additional line length are added to lines 65 in reticle B by shutter optimization program 141. The additional line length added to lines 65 is depicted as added area in minifield 1 and added area in minifield 2. While depicted as lines crossing minifield boundary 61, lines 65 could be any circuit feature or pattern utilized in a semiconductor design crossing between adjacent minifields. The additional design area added or area added could be any area added to any circuit feature or pattern in a minifield by shutter optimization program 141 when merging minifields using the depicted technique. The width of the additional design area added (e.g. the distance from the minifield boundary) may be determined by the overlap width (i.e. the distance of overlap 62 from minifield boundary 61).

FIG. 6B depicts lines 65 on each reticle (e.g., reticle A and reticle B) using a split reticle or a dual mask design commonly used in the art. A split reticle design uses two reticles where the features are divided on to two reticles. As known to one skilled in the art, a split reticle design may also be known as a dual mask system or a dual "color" system where one "color" representing one portion of the design is on one reticle and the other portion of the design is on the other reticle (i.e. the other "color") in order to improve resolution and yields in lithography.

Lines 65 are staggered on each mask in a split reticle design according to common practice for split reticle design, however, in addition, shutter optimization program 141 can change the color of lines 65 as they cross minifield boundary 61 on both reticle A and B. In other words, at minifield boundary 61, lines 65 in minifield 1 in reticle A are continued in minifield 2 in reticle A. Shutter optimization program 141 flips the colors of lines 65 at minifield boundary 61 for each reticle design (e.g. color flipping).

Reticle A in FIG. 6B is depicted for minifields 1 and 2 with lines 65 for reticle A with color flipping. Reticle B is depicted with color flipping for minifields 1 and 2 with lines 65 with an additional design area or line length added to the lines in reticle B by shutter optimization program 141. Three portions of added area are depicted on lines 65 in reticle B. When a line or circuit feature such as a pattern crosses a minifield boundary such as minifield boundary 61, the additional line length or area added to lines 65 in minifield 1 and 2 on reticle B is determined by the overlap, overlap area 62. The length of the area added to lines 65 on both sides of minifield boundary 61 in reticle B is the width of the overlap discussed previously (e.g. the width of the overlap is the shutter edge roughness, the lithography tool tolerances, and a safety factor). Shutter optimization program 141 extends the length of features such as lines 65 crossing a minifield boundary such as minifield boundary 61 in one reticle design to insure all features are connected. As illustrated, shutter optimization program 141 adds the determined overlap width to the lines in reticle B in both minifield 1 and minifield 2, however, shutter optimization program 141 may add the additional area or additional circuit length to the patterns or circuit features on either reticle (e.g., reticle A or reticle B).

FIG. 6B depicts minifield 1 and minifield 2 after reticle A and reticle B have been exposed and etched. The resulting lines 65 in minifield 1 and minifield 2 are depicted and the overlap area with this method is depicted as overlap area 68. While the method also creates a double exposure in overlap area 68, it staggers the overlap area, overlap area 68, such that the effect of double exposure is less pronounced than the method depicted in FIG. 6A since the areas for overexposure are staggered so there is less chance of wider lines connecting or creating a short after lithography processing.

In another embodiment, in semiconductor designs using split reticles and determined minifields with minifield boundaries that are not common along their length, the colors in the two non-adjacent minifields are processed at once using the overlap technique discussed with respect to FIG. 6A but, without color flipping by shutter optimization program 141. In other words, minifields may create a "checker board", the diagonal squares of the same color (i.e. on the same reticle) may be exposed and etched together. For example, a four minifield reticle field with two reticles may be processed in four iterations (i.e. perform lithography processes on the first set of diagonal minifield yellow colors, then, on the second set of diagonal minifield yellow colors, then, set of first diagonal blue colors, then on the second set of diagonal blue colors). For this type of design, shutter optimization program 141 would not need to include design changes for color flipping when minifields are created but, would impact manufacturing throughput.

Figure 6C:
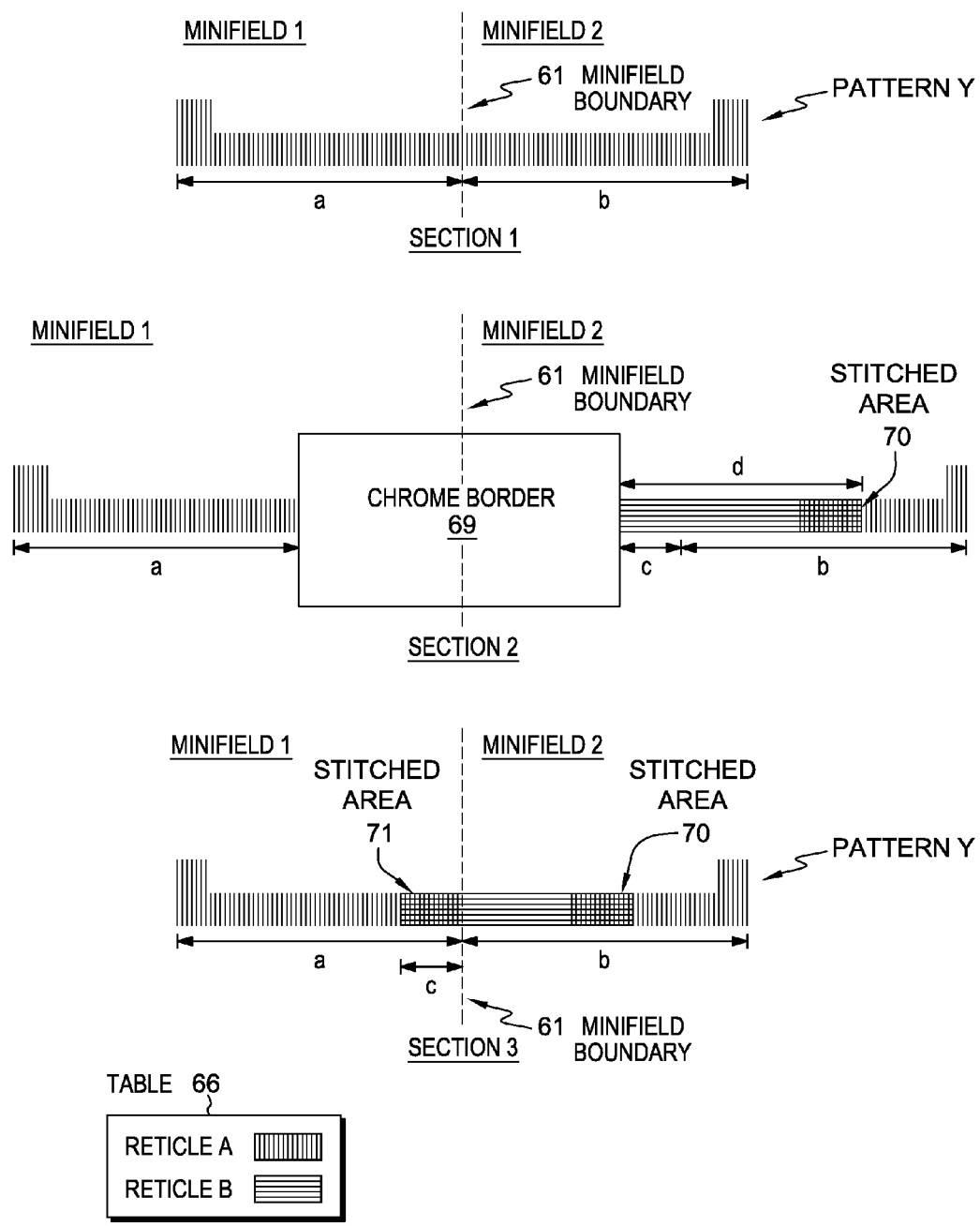
FIG. 6C is a diagram illustrating an addition of a chrome border, color flipping, an addition of additional design area for stitching minifield designs together, and a color reversion used in a design method for merging minifield designs, in accordance with an embodiment of the present invention.

FIG. 6C is a diagram illustrating the addition of a chrome border, color flipping, an addition of additional design area for stitching together minifield design data, and a color reversion used in a design method for merging minifield designs, in accordance with an embodiment of the present invention. As depicted, FIG. 6C includes minifield 1, minifield 2, pattern Y, length a, length b, length c, length d, minifield boundary 61, chrome border 69, stitched area 70, stitched area 71, and Table 66. Length "d" may be the length added to pattern Y for color flipping and color reversion.

FIG. 6C illustrates an exemplary embodiment of the present invention where shutter optimization program 141 merges or "stitches" minifields over the minifield boundary. Shutter optimization program 141 merges the minifield designs using a chrome border, an addition of design area for stitching, and color flipping in one minifield after or adjoining the chrome border along with a color reversion technique applied to the same minifields adjoining the area of color flipping in a pattern or other circuit element crossing a minifield boundary (e.g. crossing a chrome border over a minifield boundary). In the exemplary embodiment, a split reticle design is used. For example, at least two reticles (i.e. two colors, one for each reticle) are used in the one or more smaller exposure fields or minifields.

Section 1 is a top view of pattern Y as originally designed without the design additions created by shutter optimization program 141 to merge minifield designs. Section 1 illustrates the as designed pattern Y design on reticle A, as referenced in Table 66 at the bottom of FIG. 6, with minifield 1 and 2 before the minifield designs are merged by shutter optimization program 141. As depicted in section 1, pattern Y crosses minifield boundary 61 between minifield 1 and minifield 2 where length "a" depicts the length of pattern Y in minifield 1 and length "b" depicts the length of pattern Y in minifield 2. The pattern is depicted as it may be designed in a conventional design program prior to the use of shutter optimization program 141.

Section 2 is a top view of pattern Y illustrating a method to add a chrome border between two adjoining minifields after exposure of minifield 2. The portions of pattern Y on reticle A are depicted by vertical shading and the portions of pattern Y on reticle B are depicted by horizontal shading as referenced in Table 66. Chrome border 69 is added over minifield boundary 61 on both reticle A and reticle B (not shown as two chrome borders since chrome border 69 on reticle A and chrome border 69 on reticle B are the same size and are aligned over each other).

In the exemplary embodiment, shutter optimization program 141 adds chrome border 69 over minifield boundary 61 to each reticle. As known in the art, the use of the chrome borders placed over minifield boundary 61 essentially eliminates the effect of the shutters rough edges by providing a straight edge when one moves the semiconductor wafer (or moves the reticle) to align the straight edges of the chrome border during lithography processes resulting in a pattern Y after lithography processes as shown in Section 3 below. A minimum width for the chrome border may be determined by shutter optimization program 141 based on one or more of the following: the lithography tool tolerances, semiconductor design ground rules and a safety factor. Chrome borders currently used in lithography, such as chrome border 69, may be in the range of one hundred to five hundred microns wide although as lithography tooling and processes change the chrome border width is not limited to this range. As depicted, the addition of chrome borders between each minifield increases the design area for the reticle.

In addition to the chrome border, Section 2 depicts an additional length or extension of pattern Y (e.g. an additional design area) to insure electrical connections in pattern Y as pattern Y crosses the minifield boundary between minifields 1 and 2. Lithography tooling tolerances and a safety factor may be accounted for by added length "c" to insure the desired electrical connections across a minifield boundary. The additional length or the extension of pattern Y in minifield 2 depicted as length "c" insures the desired electrical connections across chrome boundary 69 inserted over minifield boundary 61. For example, the additional length of pattern Y (i.e. additional design area of pattern Y) insures pattern Y creates an electrical path between minifield 1 and 2. As depicted, color flipped or color changed length "d" which is added to reticle B in minifield 2, however, in other designs, the length "d" could be added to reticle B in minifield 1.

Section 2 depicts pattern Y split between reticle A and reticle B after exposure of minifield 2. In a split reticle design using two reticles for a reticle field, the chrome border may be added to both reticle A and reticle B over minifield boundary 61. Additionally, in the exemplary embodiment, shutter optimization program 141 flips or changes the "color" of a portion of pattern Y in minifield 2 from reticle A to reticle B. The portion of pattern Y creating the color flipped area of pattern Y which changes color after chrome border 69 (e.g. the pattern changes from being on reticle A in minifield 1 to reticle B in minifield 2) in minifield 2 is depicted as length "d". The length of the inverted or color flipped area may be determined by shutter optimization program 141 based on one or more of the following: a pre-determined length, the size of the pattern or circuit feature, length or shape of pattern Y, a percentage of pattern Y's length or size, the semiconductor design ground rules, or the design environment of the minifields which may include the spacing, shape, or size of circuit elements (i.e. lines or components) or other patterns (i.e. design patterns) in the vicinity of pattern Y. In the exemplary embodiment, a pre-determined length is used for the color flipped area. For example, a pre-determined length may be 0.05 to 0.1 microns, however, is not limited to this length. In one embodiment, the pre-determined length may be determined by the semiconductor design ground rules used in the semiconductor design.

After the color flipped area or the portion of pattern Y (i.e. length "d" of pattern Y) determined by shutter optimization program 141, a color reversion where the color of pattern Y is changed back to its original "as designed" color, or back to reticle A (e.g. as shown in the top illustration) in minifield 2. The color reversion technique provides a second color flip so that the circuit lines, patterns, or other circuit features may be returned to their original or as designed color. A designer may utilize a split reticle with two or more colors for improved lithography and semiconductor fabrication, therefore, it is desirable to change the colors flipped by shutter optimization program 141 at minifield boundary 61 back to their original as designed colors. This is especially true for long design features such as lines that were originally designed as one color to improve process yields as they go between other lines or circuit elements with another color in the minifield.

As before, in order to insure desired electrical connections in pattern Y where pattern Y on reticle A and pattern Y on reticle B join in minifield 2 (i.e. stitched area 70), an additional length or additional design area is added to pattern Y. The additional length which should be at least the length of the overlap area takes into account the lithography tooling alignment and a safety factor may be included in length "d". In the middle illustration, stitched area 70 may be formed to insure desired electrical connections when a color reversion occurs. The length of stitched area 70 may be at least the length of length "c" which is the length of the overlap area to insure overlap electrical connections. In one embodiment, shutter optimization program 141 evaluates the design environment to determine stitched area such as stitched area 71 based on the location of other adjacent components or patterns. While the middle illustration depicts the color flipped area (i.e. length "d") which includes the addition of length "c" to pattern Y and the addition of a length to pattern Y for stitched area 70 is illustrated in minifield 2, the color flipping and color reversion with associated design additions (e.g. length c and the length added for stitched area 70) may be done on either side of the inserted chrome border or in either minifield by shutter optimization program 141.

As depicted in Section 2 of FIG. 6B, the merging of minifield design data by shutter optimization program 141 includes inserting chrome border 69 in both reticles, determining an area adjoining chrome border 69 where a color in a circuit element crossing chrome border 69 is changed or flipped (i.e. length "d") and reverting the color (i.e. performing a color reversion) in the circuit element crossing the chrome border to its original color or its original as designed color or state. The color is reverted to its original as designed color after shutter optimization program 141 determines length, length "d" of the color changed area of the circuit element. The color reversion or the area where the color is reverted back to its original color is adjoining the color flipped area depicted as length "d" in pattern Y. Stitched areas 70 and 71 are each determined based, at least in part on the overlap area, and inserted as an additional circuit element length or additional design area by shutter optimization program 141 to insure electrical connections pattern Y. The additional circuit length or additional circuit area includes adding the additional design area (i.e. length "c" and stitched area 70) to one minifield of two adjoining minifields. The additional circuit length or additional circuit area added to the circuit element in one of two adjoining minifields to insure electrical connections may be at least twice the determined overlap (e.g. length "c" and stitched area 70).

In one embodiment, a default may be set for shutter optimization program 141 to perform addition of color changed area (i.e. length "d") and stitched area 70 on the minifields to the right of the minifield boundary and to the minifields on the topside of the minifield boundary. In another embodiment, shutter optimization program 141 may determine the side of the minifield boundary to add length "d" and stitched area 70 based on the design environment in the vicinity of the minifield boundary and chrome borders. For example, shutter optimization program 141 may place the color flip (e.g., length d) with pattern length additions (e.g., length "c" and for stitch area 70) and the color reversion in the minifield with the least density of metal features (e.g., lines or device components) in the vicinity of the shutter border. In one embodiment, color reversion may be added to the color flipping method depicted in FIG. 6B.

Section 3 in FIG. 6C depicts stitched area 70 and stitched area 71 on pattern Y after both minifield 1 and minifield 2 have been exposed and completed lithography processing. The wafer is moved such that when minifield 1 is exposed, length "a" of reticle A in minifield 1 is aligned with minifield boundary 61. Similarly, at expose for minifield 2, the wafer is moved so that edge of length "b" aligns with minifield boundary 61. In another embodiment, the reticles may be moved instead of the wafer such that pattern Y is developed as shown by aligning the precise, straight edges of the chrome border (e.g. the left side of chrome border 69 is aligned with the right side of chrome border 69 for each reticle). Thus, shutter optimization program 141 when executed and lithography processes are complete forms the original, as designed pattern Y from Section 1 with stitched areas 70 and 71 as depicted to insure electrical connections in the merged minifields.

While the method depicted in FIG. 6C is the program default, shutter optimization program 141 may include an icon or pull-down menu allowing the selection of another method of merging the overlap of the minifields such as a shutter overlap (depicted in FIG. 6A) or a staggered overlap with color flipping (depicted in FIG. 6B).

Figure 7:
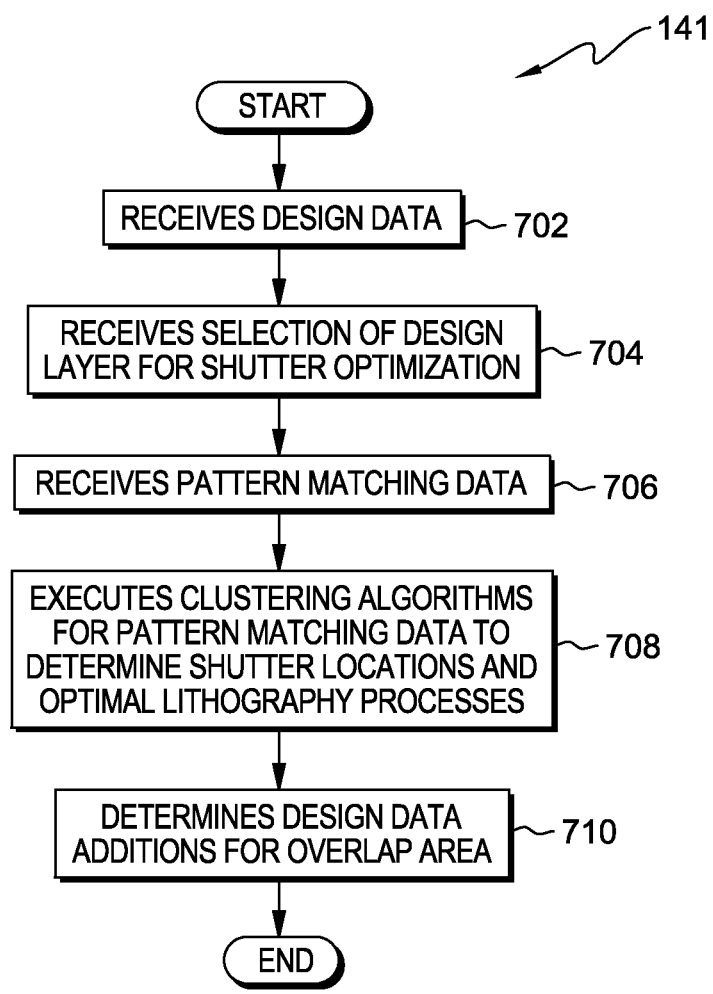
FIG. 7 is a flowchart depicting operational steps of the shutter optimization program for a lithography process, in accordance with an embodiment of the present invention.

FIG. 7 is a flowchart depicting operational steps of shutter optimization program 141 for a lithography process, on a computer within the distributed data processing environment of FIG. 1, in accordance with an embodiment of the present invention.

In step 702, shutter optimization program 141 receives design data from design program 123 on computer 120 via network 110. In the exemplary embodiment, the semiconductor design data is any type of conventional design data for a semiconductor chip. The design data is any type of semiconductor design data compatible with a lithography system such as lithography stepper 170. In the exemplary embodiment, the design data is provided by layer for the semiconductor chip design. In another embodiment, the design data may be design data for a wafer. In one embodiment, the design data may be for a function of a semiconductor chip or a function of several semiconductor chips. In an embodiment, the design data may be for another type of electronic device using a lithography system.

In step 704, shutter optimization program 141 receives from a user, such as a process lead or engineer, a selection of the semiconductor design layer to be analyzed for shutter optimization. Upon receipt of the layers to be analyzed, shutter optimization program 141 sends the associated semiconductor design layer data to pattern matching program 144. In the exemplary embodiment, shutter optimization program 141 receives from the user an input such as a parameter file identifying the layers of the semiconductor design to be analyzed. For example, a gate design level layer or a first metal layer such as M1 may be selected. In one embodiment, shutter optimization program 141 receives a request to analyze more than one semiconductor design layer. In an embodiment, shutter optimization program 141 may be configured to analyze all layers of the design data for the semiconductor chip or wafer. In one embodiment, the algorithms of pattern matching program 144 are incorporated into shutter optimization program 141 and shutter optimization program 141 identifies patterns and their locations.

A reticle may be formed using appropriate scaling factors, based on design of a layer of a semiconductor chip, although not all reticles are formed based on a layer of a semiconductor chip. For the purposes of embodiments of the present invention, a dual color system where two reticles, which split the design between the two reticles using staggered lines or features, are used to form a layer of a semiconductor chip. A dual color system or a dual mask system using two reticles for an exposure field is commonly used and known to one skilled in the art. While a layer of a semiconductor chip design is assumed for the purposes of the discussion of the present invention, embodiments of the invention are not limited to this and may use two chips or a function within a chip as a reticle design(s) for a reticle field.

While the program default provides an analysis of the semiconductor design data using pattern matching data from pattern matching program 144 and clustering algorithms associated with pattern matching data, other embodiments of the invention may use other semiconductor design analysis data, or modelling data and clustering algorithms customized to analyze the specific design data analysis type (i.e. shorts and opens data uses clustering algorithms developed or configured for analyzing shorts and opens for minifield creation). In step 704, shutter optimization program 141 can provide an option which may be an icon of a pull-down menu in which a user may select another type of semiconductor design analysis data or modelling data to receive and be processed by shutter optimization program 141. Based on the selection of the type of semiconductor design analysis data, shutter optimization program 141 will load the pre-set clustering algorithms associated with the selected type of data to analyze the data to determine optimum shutter locations and optimal lithography processes for the resulting minifields. For example, a user may select an icon indicating "overlay error data" and shutter optimization program 141 loads overlay error clustering algorithms, and can receive overlay data in the following step.

In the case of a multi-lithography stepper manufacturing line, it may be necessary for a user to identify the specific lithography tool used for manufacture of the semiconductor design data evaluated by shutter optimization program 141. In step 704, the user identification of the specific lithography tool such as lithography stepper 170 in a multi-stepper lithography manufacturing line may occur via a pull-down menu.

In step 706, shutter optimization program 141 receives pattern matching data including pattern location from pattern matching program 144. Pattern matching program 144 is pre-loaded with all of the patterns in design construct database 143 and is updated when new design patterns are added to design construct database 143. In the exemplary embodiment, shutter optimization program 141 receives the pattern matching data identifying the patterns and the location of each of the patterns in a specified layer of a semiconductor design from pattern matching program 144. In an embodiment, the pattern matching data is sent to a database on server 140 or another computer and retrieved by shutter optimization program 141. The pattern matching data may be stored in a pattern matching database on server 140.

In another embodiment of the present invention, shutter optimization program 141 receives other semiconductor design analysis or modelling data. For example, in other embodiments, shutter optimization program 141 may receive overlay error modelling data, thin film stress analysis data, metal density modelling data, component partitioning data, empirical data such as yield data, or shorts and opens modelling data from the respective design analysis programs. In an embodiment, shutter optimization program 141 retrieves the design analysis program data from a database storing design analysis data.

In step 708, shutter optimization program 141 executes clustering algorithms for pattern matching data to determine shutter locations and optimal lithography processes. In an embodiment, known clustering algorithms may be utilized in shutter optimization program 141. In the exemplary embodiment, clustering algorithms are set to group patterns together based on the pattern matching data and the number of minifields. In the exemplary embodiment, the number of minifields is pre-set. For example, the number of minifields may be pre-set to three. Shutter optimization program 141 runs clustering algorithms based on pattern matching data received from pattern matching program 144 and determines an optimal location of each of the four minifields and the associated optimal shutter locations. The shutter location, which may be identified by a representative line or "minifield boundary" in the reticle field, is placed between adjacent minifields by shutter optimization program 141.

In one embodiment, a user such as a process lead selects the specific patterns to be evaluated by shutter optimization program 141. In the exemplary embodiment, shutter optimization program 141 receives a parameter file from the user identifying the patterns to be evaluated. In an embodiment, shutter optimization program 141 may include a pull-down menu or icon such as "select patterns for evaluation". If selected by the user, shutter optimization program 141 may provide the pre-loaded patterns which may be segregated by type of pattern. For example, patterns may be grouped by type of devices or logic components such as cache, microprocessors, capacitors or deep trench capacitors, by pattern shape such as lines, or other appropriate categories. The patterns selected by the user may be based on the type of chip or logic design, the layer selected for evaluation, a simulation or model result, historical process yield data, or engineering judgment.

In one embodiment, shutter optimization program 141 has pre-loaded the optimal processes for the patterns from process optimization database 145 and may use clustering algorithms based on grouping patterns or ranking patterns based on similar optimal process parameters. In an embodiment, shutter optimization program 141 receives a user selection of the process parameters to use in the clustering algorithms. For example, shutter optimization program 141 may cluster or group patterns based on one or more of the following: focus, dose, source, difficulty rating in expose and etch of the pattern (i.e. based on lithography yields), similar lithography processing parameters for the patterns, sections of parallel lines and direction, process yields, or other user determined parameter selected from a pull-down menu, icon or received in a parameter file by shutter optimization program 141. In an embodiment, patterns are grouped by a lithography parameter such as a similar dose or focus. For example, patterns with a similar focus and dose may be patterns using a range of focus 3 to 5 and a dose of 1.1 to 3.0. In an embodiment, the range of a dose or focus may be determined by using multiplier such as 1.02 or 1.07 around an optimal dose or focus (i.e. a range of 0.98 or 1.02 times an optimal dose) to group patterns. In yet another embodiment, patterns are grouped together by a source. In another embodiment, patterns may be grouped or clustered by shutter optimization program 141 based on similar yields and stored in process optimization database 145.

Shutter optimization program 141 determines the optimal lithography processes for each minifield. In the exemplary embodiment, shutter optimization program 141 analyzes the pattern data provided by pattern matching program 144 to determine the dominant pattern or most frequently used pattern in a minifield. Once the dominant or most common pattern is identified, shutter optimization program 141 retrieves from process optimization database 145 the optimal processes associated or stored for the pattern (i.e. dominant pattern). The optimal processes for the dominant or most frequently used pattern may be identified and retrieved by shutter optimization program 141. The optimal processes retrieved from process optimization database 145 may be sent via network 110 to lithography stepper 170 by shutter optimization program 141.

As discussed in the previous steps, in other embodiments of the present invention, the clustering algorithms used in shutter optimization program 141 are customized for the other types of semiconductor design analysis and modelling data as selected by the user in step 704. The selected semiconductor design analysis or modelling data is analyzed using the associated clustering algorithms to determine the minifields and shutter locations. For example, when shutter optimization program 141 receives a user selection of shorts and opens modelling of a layer of semiconductor design for minifield creation, the program selects the clustering algorithms associated with shorts and opens data to determine the minifields and associated shutter locations and determine patterns in the minifields with associated optimal processes.

In step 710, shutter optimization program 141 determines design data additions for the overlap area. The default design additions are the design additions previously discussed in the method depicted in FIG. 6C. Using a split reticle design, shutter optimization program 141 adds a chrome border to the reticles, or both reticles in a split reticle design. Shutter optimization program 141 determines the overlap area and overlap length based, at least in part, on the lithography tool tolerances which may be pre-loaded by lithography stepper and a program determined safety factor. Shutter optimization program 141 changes the color in a circuit element (i.e. pattern Y) adjoining a chrome border in one minifield, performs a color reversion to return the color of the circuit element to its original as designed color and, adds the additional circuit feature or additional line length to the circuit elements crossing the chrome border on one side of the chrome border. As discussed in FIG. 6C, the additional line length or additional area added to a pattern is at least the length "c", the overlap and the stitched area which must be at least the area formed with the addition of another length "c". In other words, the length of the additional area added to a pattern when shutter optimization program 141 merges minifield designs may be twice the overlap or length "c". In the exemplary embodiment, the method used by shutter optimization program 141 to merge pattern designs on a split reticle for adjacent minifields creates two stitched areas insuring electrical connections between circuit elements crossing the border between minifields. Upon completion of design data additions, shutter optimization program 141 ends.

In one embodiment, a user determines that further lithography process optimization is needed using shutter optimization program 141. When a user desires further lithography process optimization by shutter optimization 141, shutter optimization program 141 may receive user input (i.e. returns to step 706), such as a parameter file, to further customize clustering algorithms or a pull down menu may be provided to change clustering algorithms such as the number of minifields desired. Upon completion of customization of clustering algorithms, the user may re-run shutter optimization program 141 on the desired semiconductor design data. In this example, upon receiving the new information for clustering algorithms, shutter optimization program 141 proceeds to step 708.

Figure 8:
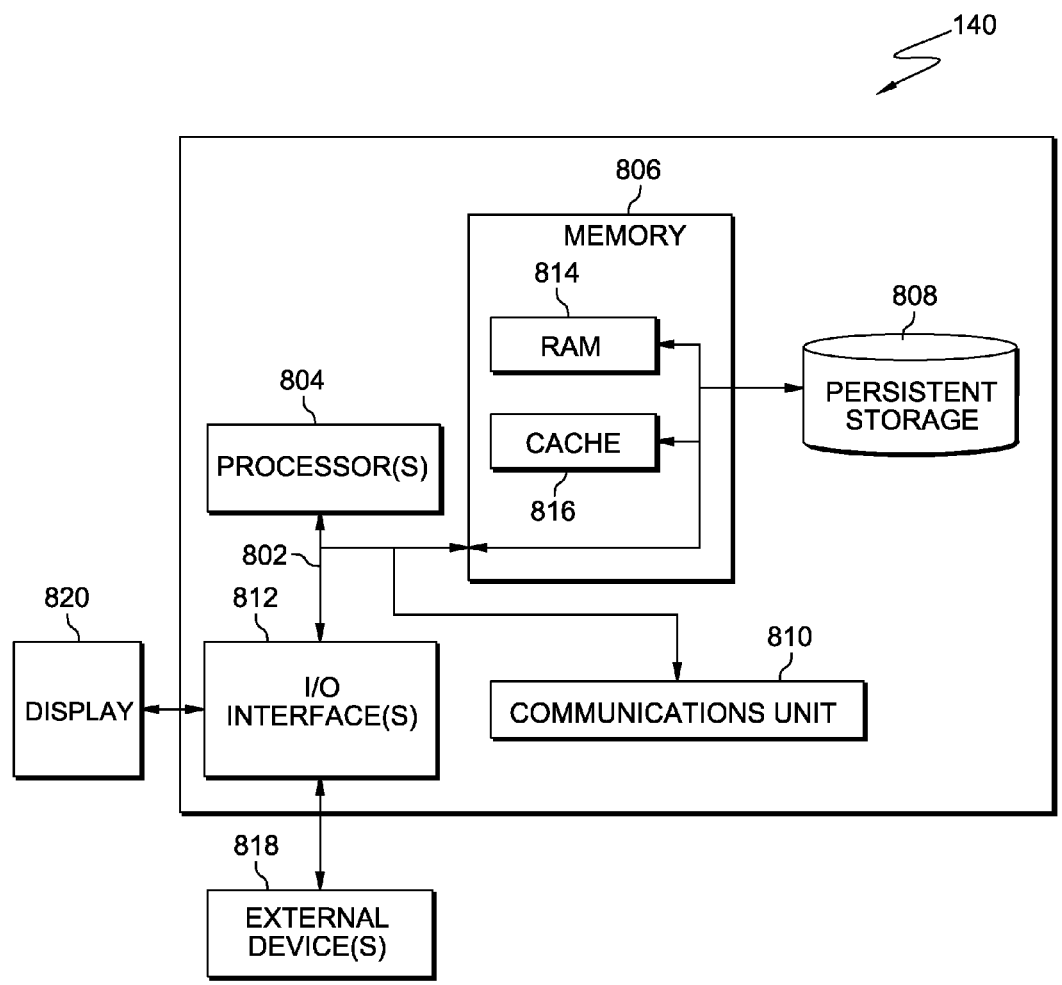
FIG. 8 depicts a block diagram of components of the server computer executing the shutter optimization program, in accordance with an embodiment of the present invention.

FIG. 8 depicts a block diagram of components of server 140 executing shutter optimization program 141, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Server 140 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM) 814 and cache memory 816. In general, memory 806 can include any suitable volatile or non-volatile computer readable storage media.

Shutter optimization program 141, design construct database 143, pattern matching program 144, and process optimization database 145 are stored in persistent storage 808 for execution and/or access by one or more of the respective computer processor(s) 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of distributed data processing environment 100, computer 120, and lithography stepper 170. In these examples, communications unit 810 includes one or more network interface cards. Communications unit 810 may provide communications through the use of either or both physical and wireless communications links. Shutter optimization program 141, design construct database 143, pattern matching program 144, and process optimization database 145 may be downloaded to persistent storage 808 through communications unit 810.

I/O interface(s) 812 allows for input and output of data with other devices that may be connected to server 140. For example, I/O interface(s) 812 may provide a connection to external device(s) 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, shutter optimization program 141, design construct database 143, pattern matching program 144, and process optimization database 145 can be stored on such portable computer readable storage media and can be loaded onto persistent storage 808 via I/O interface(s) 812. I/O interface(s) 812 also connects to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining one or more exposure areas and associated lithography process parameters for the one or more exposure areas in a reticle field, the method comprising:

receiving, using one or more computing devices, a semiconductor design and sending, using one or more computing devices, the semiconductor design to a design analysis program;

receiving, using one or more computing devices, data from the design analysis program; and determining, using one or more computing devices, one or more exposure areas in the reticle field, and at least one lithography process parameter for each of the one or more exposure areas in the reticle field based, at least in part, on the data received from the design analysis program, the semiconductor design, and one or more clustering algorithms associated with the design analysis program.

2. The method of claim 1, wherein the design analysis program includes at least one of the following programs: a pattern matching program, an overlay error program, a shorts and opens program, a thin film stress program, a metal density analysis program, a parallel wiring analysis program, and an empirical data analysis program.

3. The method of claim 1, wherein the determining one or more exposure areas in the reticle field further comprises:

retrieving pattern matching data; and determining, based, in part, on the pattern matching data and a pre-set number of the one or more exposure areas in the reticle field, one or more shutter locations.

4. The method of claim 1, wherein the determining at least one lithography process parameter for one or more exposure areas in the reticle field further comprises:

identifying a dominant pattern in each of the one or more exposure areas in the reticle field; and retrieving the at least one lithography process parameter for the identified dominant pattern in said each of the one or more exposure areas in the reticle field from a database, wherein the database stores one or more patterns each associated with at least one lithography process parameter.

5. The method of claim 4, wherein the determining at least one lithography process parameter includes retrieving the at least one lithography process parameter optimized for the identified dominant pattern.

6. The method in claim 1, wherein the determining one or more exposure areas in the reticle field further comprises:

inserting, into both reticles of a split reticle design, a chrome border between the one or more exposure areas;

determining, in an exposure area of two adjoining exposure areas of the one or more exposure areas in the reticle field, an area where a color in an area adjoining the chrome border in the exposure area of two adjoining exposure areas is changed in a circuit element crossing the chrome border;

reverting, in the exposure area of the two adjoining exposure areas, the changed color in the area adjoining the chrome border to an original color of the changed color in an area adjoining the changed color in the circuit element crossing the chrome border;

determining an overlap area based, at least in part, on one or more lithography tooling tolerances and a safety factor;

determining an additional length for circuit elements crossing the chrome border between the two adjoining exposure areas whose size is at least twice as that of the determined overlap area; and inserting, in the exposure area of the two adjoining exposure areas of the one or more exposure areas in the reticle field, the additional length for circuit elements crossing the chrome border between the two adjoining exposure areas of the one or more exposure areas.

7. The method of claim 6, further comprising determining, based at least in part on the overlap area, at least two areas in the circuit element crossing the chrome border are overlapped, wherein the additional length of the circuit elements is in the circuit element.

8. The method of claim 1, further comprises inserting an overlay alignment mark to each of the one or more exposure areas in the reticle field, wherein a location of the overlay alignment mark is determined based on data received from the design analysis program and the one or more clustering algorithms associated with the design analysis program.

9. A computer program product comprising one or more non-transitory computer readable storage media on which program instructions are stored on the one or more non-transitory computer readable storage media, the program instructions, when executed by one or more computer processor, cause said one or more computer processors to determine one or more exposure areas and associates lithography processor parameters for the one or more exposure areas in a reticle field, the program instructions comprising:

program instructions to receive a semiconductor design and send the semiconductor design to a design analysis program;

program instructions to receive data from the design analysis program; and program instructions to determine the one or more exposure areas in the reticle field, and at least one lithography process parameter for each of the one or more exposure areas each in the reticle field based, at least in part, on the data received from the design analysis program, the semiconductor design, and one or more clustering algorithms associated with the design analysis program.

10. The computer program product of claim 9, wherein the design analysis program includes at least one of the following programs: a pattern matching program, an overlay error program, a shorts and opens program, a thin film stress program, a metal density analysis program, a parallel wiring analysis program, and an empirical data analysis program.

11. The computer program product of claim 9, wherein the program instructions to determine the one or more exposure areas in the reticle field further comprises:

program instructions to retrieve pattern matching data; and program instructions to determine, based in part on the pattern matching data and a pre-set number of the one or more exposure areas in the reticle field, one or more shutter locations.

12. The computer program product of claim 9, wherein the program instructions to determine at least one lithography process for each exposure area of the one or more exposure areas in the reticle field further comprises:

program instructions to identify a dominant pattern in each exposure area of the one or more exposure areas in the reticle field; and program instructions to retrieve the at least one lithography process parameter for the identified dominant pattern in the reticle field from a database, wherein the database stores one or more patterns each associated with at least one lithography process parameter.

13. The computer program product of claim 9, wherein the program instructions to determine the one or more exposure areas in the reticle field further comprises:

program instructions to insert, into both reticles of a split reticle design, a chrome border between the one or more exposure areas in the reticle field;

program instructions to determine, in an exposure area of two adjoining exposure areas of the one or more exposure areas in the reticle field, an area where a color in an area adjoining the chrome border is the exposure area of the two adjoining exposure areas is changed in a circuit element crossing the chrome border;

program instructions to revert, in the exposure area of the two adjoining exposure areas, the changed color in the area adjoining the chrome border to an original color of the changed color in an area adjoining the changed color in the circuit element crossing the chrome border program instructions to determine an overlap area based, at least in part, on one or more lithography tooling tolerances and a safety factor;

program instructions to determine an additional length for circuit elements crossing the chrome border between the two adjoining exposure areas of the one or more exposure areas in the reticle field whose size is at least twice as that of the determined overlap area; and program instructions to insert, in the exposure area the two adjoining exposure areas, the additional length of the one or more exposures in the reticle field, the additional length for circuit elements crossing the chrome border between the adjoining exposure area of the one or more exposure areas in the reticle field.

14. The computer program product of claim 13, further comprising the program instructions to determining, based at least in part on the overlap area, at least two areas in the circuit element crossing the chrome border are overlapped, wherein the additional length of the circuit elements is in the circuit element.

15. The computer program product of claim 9, further comprising:

program instructions to insert an overlay alignment mark to each exposure area of the one or more exposure areas, wherein a location of the overlay alignment mark is determined based on data received from the design analysis program and the one or more clustering algorithms associated with the design analysis program.

16. A computer system for determining one or more exposure areas and associated lithography process parameters for the one or more exposure areas in a reticle field, the computer system comprising:
one or more computer processors;
one or more non-transitory computer readable storage media;
program instructions stored on the one or more non-transitory computer readable storage media for execution by at least one of the one or more processors, the program instructions comprising:
program instructions to receive a semiconductor design and send the semiconductor design to a design analysis program;
program instructions to receive data from the design analysis program; and
program instructions to determine the one or more exposure areas in the reticle field, and at least one lithography process parameter for each of the one or more exposure areas in the reticle field based at least in part on the data received from the design analysis program, the semiconductor design, and one or more clustering algorithms associated with the design analysis program.

17. The computer system of claim 16, wherein the design analysis program includes at least one of the following programs: a pattern matching program, an overlay error program, a shorts and opens program, a thin film stress program, a metal density analysis program, a parallel wiring analysis program, and an empirical data analysis program.

18. The computer system of claim 16, wherein the program instructions to determine the one or more exposure areas in the reticle field further comprises:
program instructions to retrieve pattern matching data; and
program instructions to determine, based in part on the pattern matching data and a pre-set number of the one or more exposure areas in the reticle field, one or more shutter locations.

19. The computer system of claim 16, wherein the program instructions to determine at least one lithography process parameter for each exposure of the one or more exposure areas in the reticle field further comprises program instructions to identify a dominant pattern in each exposure area of the one or more exposure areas in the reticle field; and
program instructions to retrieve at least one lithography process parameter for the identified dominant pattern from a database, wherein the database stores one or more patterns each associated with at least one lithography process parameter.

20. The computer system of claim 16, further comprising:
program instructions to insert an overlay alignment mark to each exposure area of the one or more exposure areas in the reticle field, wherein a location of the overlay alignment mark is determined based on data received from the design analysis program and the one or more clustering algorithms associated with the design analysis program.

* * * * *